Patented May 7, 1946

2,400,050

UNITED STATES PATENT OFFICE 2,400,050

TETRAHYDROFURFURYL ETHER OF AMINO-DIPHENYLAMINE

Robert P. Parker, Somerville, and Corris Mabelle Hofmann, Bound Brook, N. J., assignors to American Cyanamid Company, New York, N. Y., a corporation of Maine No Drawing. Application July 3, 1944, Serial No. 543,436

6 Claims. (Cl. 260—345)

This invention relates to tetrahydrofurfuryloxy diphenylamine derivatives having the following formula:

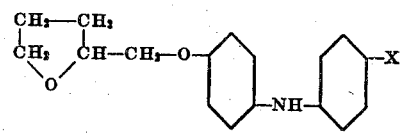

wherein X is a member of the group consisting of nitro and amino groups and salts of the latter.

The new compounds where X is amino or its salt find their principal use as intermediates for the production of azo dyes. They can be diazotized and coupled with a wide range of coupling components but are particularly important in the production of ice colors producing valuable blue to violet shades which exhibit superior properties such as fastness to light, heating, washing and crocking.

It is not intended to limit the present invention to any single process of preparing the new compounds. A very effective method is by the reaction of 4'-hydroxy-4-nitro diphenylamine with the tetrahydrofurfuryl ester of an acid, organic or inorganic. Excellent results are obtained by using the ester of organic sulfonic acids and these are preferred by reason of the smooth reaction and high yields obtainable.

The reaction results in the setting free of the acid portion of the ester, and it is therefore preferable to carry out the reaction in the presence of a suitable acid binding substance. We have found that the most efficient acid binding substances are alkali metal hydroxides or alkoxides and these are preferred although the invention is not intended to be limited thereto, other acid binding substances being useful.

It is an advantage of the present invention that polar solvents such as water, alcohols or mixtures thereof can be used and these are in fact the preferred solvents. When water is used no solvent recovery problem is presented.

The reduction of the nitro group to the amino group for the production of the preferred compounds may be effected under either alkaline or acid conditions. The results are good in both cases, the pH determining whether the amino compound is produced in the form of the free base or of a salt in the case of an acidic reducing agent. It is an advantage of the present invention that the reduction step is not critical and proceeds smoothly with good yield.

The invention will be described in greater detail in conjunction with the following specific examples which are typical illustrations thereof.

Example 1

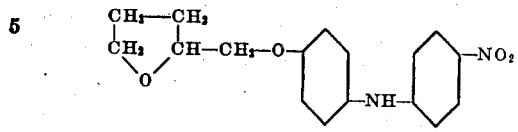

23 parts of 4'-hydroxy-4-nitro diphenylamine are dissolved in 50 parts of water by the addition of 4.4 parts of sodium hydroxide in a suitable reaction vessel and the solution is heated to reflux temperature. 28.2 parts of tetrahydrofurfuryl para-toluene sulfonate are dropped in slowly and the reaction is completed by refluxing for four hours. The reaction mixture is cooled and the 4'-tetrahydrofurfuryloxy-4-nitro diphenylamine is allowed to settle. The supernatant liquor is removed and the crude product is of sufficient purity for direct use.

Example 2

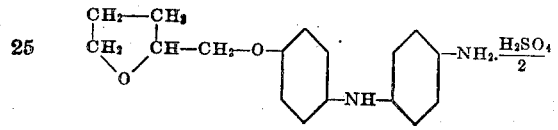

9.4 parts of the nitro compound as obtained in Example 1 are stirred together with 17.8 parts of alcohol and 36.9 parts of a 45% sodium sulfhydrate solution and the whole is refluxed until reduction is complete. The addition of 75 parts of water precipitates an oil which is extracted with ether. The ether extract is separated from the reduction mixture, is washed by decantation with water and is then treated with 3 parts of concentrated sulfuric acid. An oil is precipitated from the ether solution which is separated and is dissolved in 125 parts of water. After clarification of the aqueous solution in the presence of decolorizing carbon, the neutral sulfate of 4'-tetrahydrofurfuryloxy-4-amino diphenylamine is salted out by the addition of sodium sulfate.

If it is desired to regenerate the free base, this may be effected by neutralization of an aqueous solution of the salt in the conventional manner.

Example 3

6.3 parts of 4'-tetrahydrofurfuryloxy-4-nitro diphenylamine obtained as in Example 1 are stirred into 50 parts of hydrochloric acid (1.19) and the temperature is raised to 50° C. While agitating efficiently 8 parts of 20 mesh tin are added gradually portionwise. When addition is complete the reaction temperature is maintained at 80° C. until reduction is complete. After cooling, the stannous chloride double salt of the hydro-chloride of 4'-tetrahydrofurfuryloxy-4-aminodiphenylamine is filtered off.

This product may be used in its double salt form for the production of azo dyestuffs or it may be liberated from the stannous chloride by the customary procedures.

*Example 4*

3.1 parts of the neutral sulfate salt of 4'-tetrahydrofurfuryloxy-4-aminodiphenylamine as obtained in Example 2 are dissolved in 35 parts of water and 12 parts of 17% hydrochloric acid are added. The resulting solution is iced to 15° C. and a solution of 0.83 part of sodium nitrite in 11 parts of water is slowly added until diazotization is complete. The resulting diazo solution is clarified by filtration in the presence of decolorizing carbon at 40° C. and the resulting filtrate is treated with sodium chloride. The precipitated diazonium chloride derived from 4'-tetrahydrofurfuryloxy-4-aminodiphenylamine is separated by filtration and is dried at low temperature.

*Example 5*

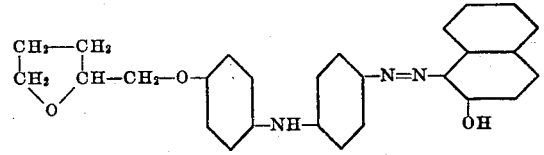

2.3 parts of the dry diazonium chloride obtained as described in Example 4 are blended by grinding with one part of magnesium sulfate dihydrate and one part of anhydrous sodium sulfate to a homogeneous powder.

0.4 part of the color blend is stirred in 2.5 parts of methanol and the slurry is treated with a mixture of 1.5 parts of beta-naphthol in 2.5 parts of methanol containing 5.0 parts of pyridine. The mixture changes to a deep blue-black slurry immediately and a thick paste results. This is stirred while heated on a steam bath for 10 minutes and is then diluted with 300 parts of water and the solution is made alkaline with 10 parts of 20% sodium hydroxide solution. The precipitated pigment is flocculated by digestion on a steam bath, is filtered off, is washed with hot water and is dried at 55° C.

A deep blue-black powder results, insoluble in water.

*Example 6*

The blended diazonium chloride as prepared in Example 5 is used to produce developed dyeings on cotton fabric by the following procedure:

Cotton fabric is treated in alkaline grounding baths comprising 5 parts of ice color coupling components, 5 parts of methanol, 20 parts of 20% sodium hydroxide solution and 470 parts of water. The treated cloth is passed between squeeze rolls and is immediately dried at 65° C.

5 parts of a fabric so treated is entered in a dye bath containing 0.3 parts of the dry blended mixture of diazonium chloride dissolved in 150 parts of water and while the fabric is efficiently agitated, 5 parts of 20% sodium acetate solution are run in.

When full color development is obtained, the fabric is rinsed in warm water, is cleared at 70° C. in an alkaline solution (3% soda ash and 2% sodium hydroxide) for 2 minutes, then treated at 70° C. in a ½% soap solution, rinsed in fresh water and dried.

The colors obtained with various ice color coupling components are listed below:

2-hydroxy-3-naphthoic acid-(2'-ethoxyanilide) _____ Reddish shade of blue
2-hydroxy-3-naphthoic acid-(2'-naphthylamide) _____ Strong greenish blue
Bis-(acetoacetic)-ortho-tolidide___ Golden yellow
2-hydroxy-3-carbazole carboxylic acid-(2'-methylanilide) _____ Purple
2-hydroxy-3-naphthoic acid-(4'-chloroanilide) _____ Bright greenish blue

*Example 7*

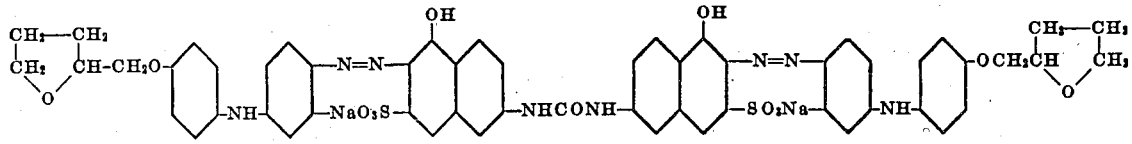

1.7 parts of the sulfate salt of 4'-tetrahydrofurfuryloxy-4-amino-diphenylamine produced as described above in Example 2 are stirred in 30 parts of 17% hydrochloric acid. The temperature is adjusted at 15° C. and the slurry is diazotized by the slow addition of 3.5 parts of 10% sodium nitrite solution.

1.4 parts of 5,5'-dihydroxy-2,2'-dinaphthylurea-7,7'-disulfonic acid are dissolved in 40 parts of water and 3.1 parts of soda ash are dissolved in the solution. The temperature is adjusted at 10° C. and the above prepared diazo solution is slowly dropped in with efficient agitation. Coupling is immediate with the formation of a deep blue color. The solution is treated with sodium chloride until the dyestuff is completely salted out and the dyestuff is isolated by filtration.

After drying at 40° C., a deep blue-black solid is obtained which is readily soluble in water, yielding a blue solution.

We claim:
1. Compounds having the following formula:

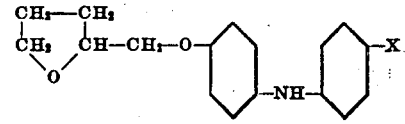

in which X is selected from the group consisting of nitro, amino and acid addition salts of amino.

2. A compound having the following formula:

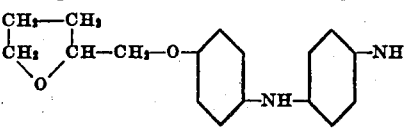

3. 4'-tetrahydrofurfuryloxy-4-nitro diphenylamine having the following formula:

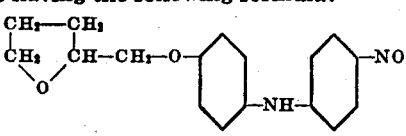

4. A method of preparing 4'-tetrahydrofurfuryloxy-4-nitro diphenylamine which comprises reacting a tetrahydrofurfuryl ester with 4'-hydroxy-4-nitro diphenylamine in the presence of an acid binding substance.

5. A method of preparing 4'-tetrahydrofurfuryloxy-4-amino diphenylamine which comprises reacting 4'-hydroxy-4-nitro diphenylamine with a tetrahydrofurfuryl ester in the presence of an acid binding substance and subjecting the nitro compound thus produced to reduction of the nitro group to the amino group.

6. A method according to claim 4 in which the ester is tetrahydrofurfuryl para-toluene sulfonate.

ROBERT P. PARKER.
CORRIS MABELLE HOFMANN.